(12) United States Patent
Takiyanagi

(10) Patent No.: US 6,434,711 B1
(45) Date of Patent: Aug. 13, 2002

(54) DISK ARRAY APPARATUS THAT AVOIDS PREMATURE DECLARATIONS OF FAULTS

(75) Inventor: Masumi Takiyanagi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/328,447

(22) Filed: Jun. 9, 1999

(30) Foreign Application Priority Data

Jun. 12, 1998 (JP) .......................................... 10-165054

(51) Int. Cl.⁷ .................................................. H02H 3/05
(52) U.S. Cl. ...................... 714/8; 714/5; 714/6; 714/7; 711/112
(58) Field of Search ............................... 714/5, 6, 7, 8; 711/112, 114

(56) References Cited

U.S. PATENT DOCUMENTS

| | | | | |
|---|---|---|---|---|
| 3,771,143 A | * | 11/1973 | Taylor .......................... | 360/25 |
| 3,987,490 A | * | 10/1976 | Highnote et al. ......... | 360/281.2 |
| 4,914,656 A | * | 4/1990 | Dunphy et al. ................. | 714/7 |
| 5,072,378 A | * | 12/1991 | Manka ........................... | 714/6 |
| 5,166,936 A | * | 11/1992 | Ewert et al. .................. | 360/53 |
| 5,271,012 A | * | 12/1993 | Blaum et al. ................... | 714/6 |
| 5,278,838 A | * | 1/1994 | Ng et al. ........................ | 714/6 |
| 5,303,244 A | * | 4/1994 | Watson ........................ | 365/200 |
| 5,371,745 A | * | 12/1994 | Kiyonaga et al. ........... | 714/758 |
| 5,479,611 A | * | 12/1995 | Oyama ......................... | 714/48 |
| 5,596,709 A | * | 1/1997 | Bond et al. ..................... | 714/7 |
| 5,623,595 A | * | 4/1997 | Bailey ............................ | 714/6 |
| 5,778,167 A | * | 7/1998 | Carrel et al. ................. | 711/165 |
| 5,815,647 A | * | 9/1998 | Buckland et al. ........... | 710/104 |
| 5,826,001 A | * | 10/1998 | Lubbers et al. ............. | 711/114 |
| 5,918,001 A | * | 6/1999 | Ueno et al. .................. | 714/710 |
| 5,968,182 A | * | 10/1999 | Chen et al. .................... | 714/42 |
| 6,032,217 A | * | 2/2000 | Arnott ......................... | 710/200 |

FOREIGN PATENT DOCUMENTS

| | | |
|---|---|---|
| JP | 7-200191 | 8/1995 |
| JP | 9-231014 | 9/1997 |
| JP | 11-95933 | 4/1999 |

OTHER PUBLICATIONS

Adaptec, Inc. "What is RAID?" http://www.adaptec.com/worldwide/product/markeditorial.html?prodkey=raid_wp&cat=%2fTechnology%2fRAID%2f&type=RAID [Dec. 6, 2001].*
Adaptec, Inc. "A Quick Explanation of RAID" http://www.adaptec.com/worldwide/product/markeditorial.html-?prodkey=quick_explanation_of_raid [Dec. 6, 2001].*

* cited by examiner

Primary Examiner—Robert Beausoleil
Assistant Examiner—Gabriel Chu
(74) Attorney, Agent, or Firm—McGinn & Gibb, PLLC

(57) ABSTRACT

A disk array apparatus includes a detection unit, delay unit, instruction issue unit, first determination unit, and assignment unit. The detection unit detects a faulty magnetic disk device delayed in response to a read instruction from a host device out of a plurality of magnetic disk devices constituting an array. The delay unit outputs a delay signal on the basis of an output from the detection unit. The instruction issue unit issues a retry instruction to the faulty magnetic disk device on the basis of the delay signal from the delay unit. The first determination unit determines in response to the retry instruction from the instruction issue unit whether the faulty magnetic disk device normally ends read processing. The assignment unit assigns a defective alternate block to the faulty magnetic disk device when the determination result of the first determination unit does not represent a normal processing end.

17 Claims, 5 Drawing Sheets

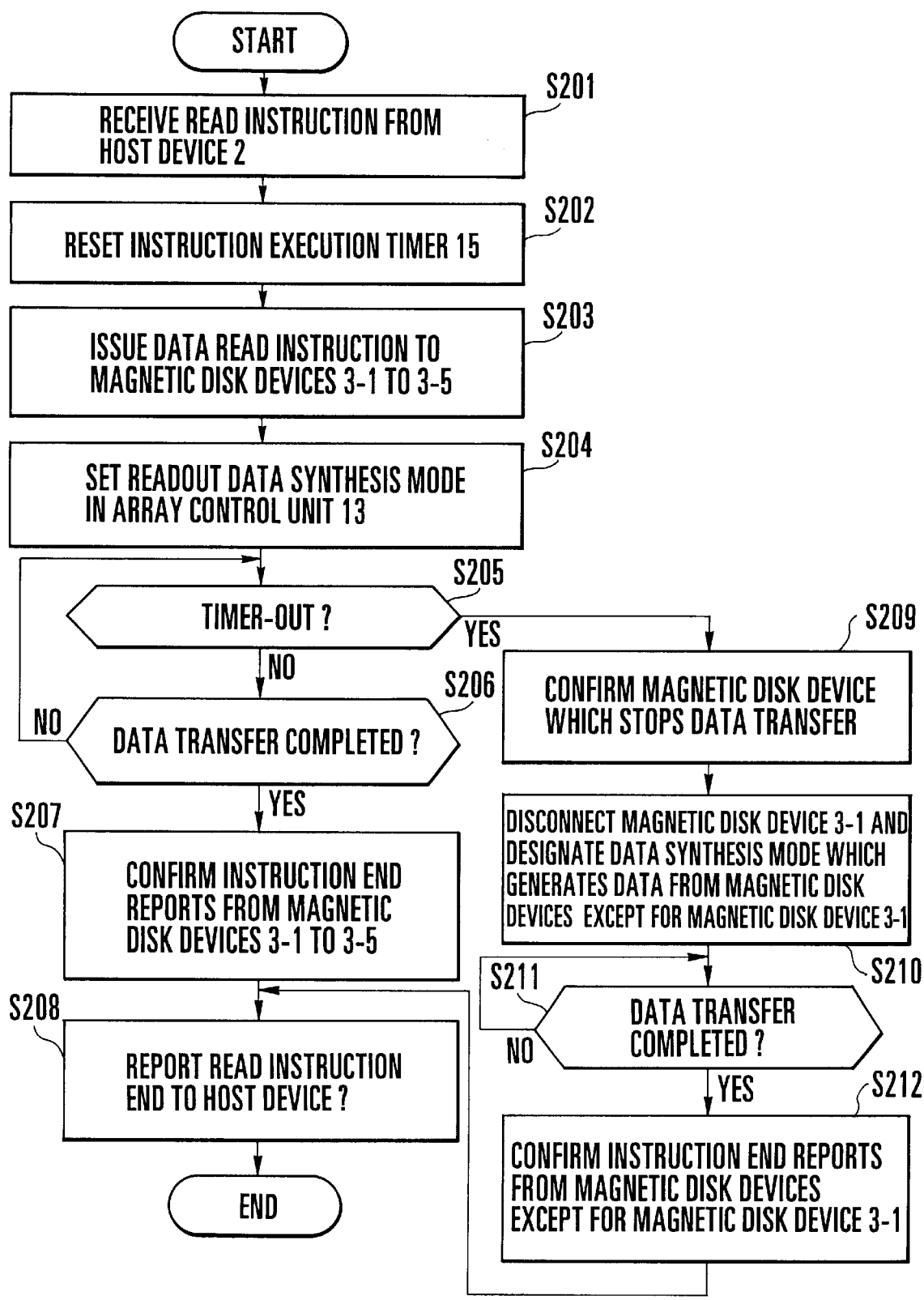
F I G. 2

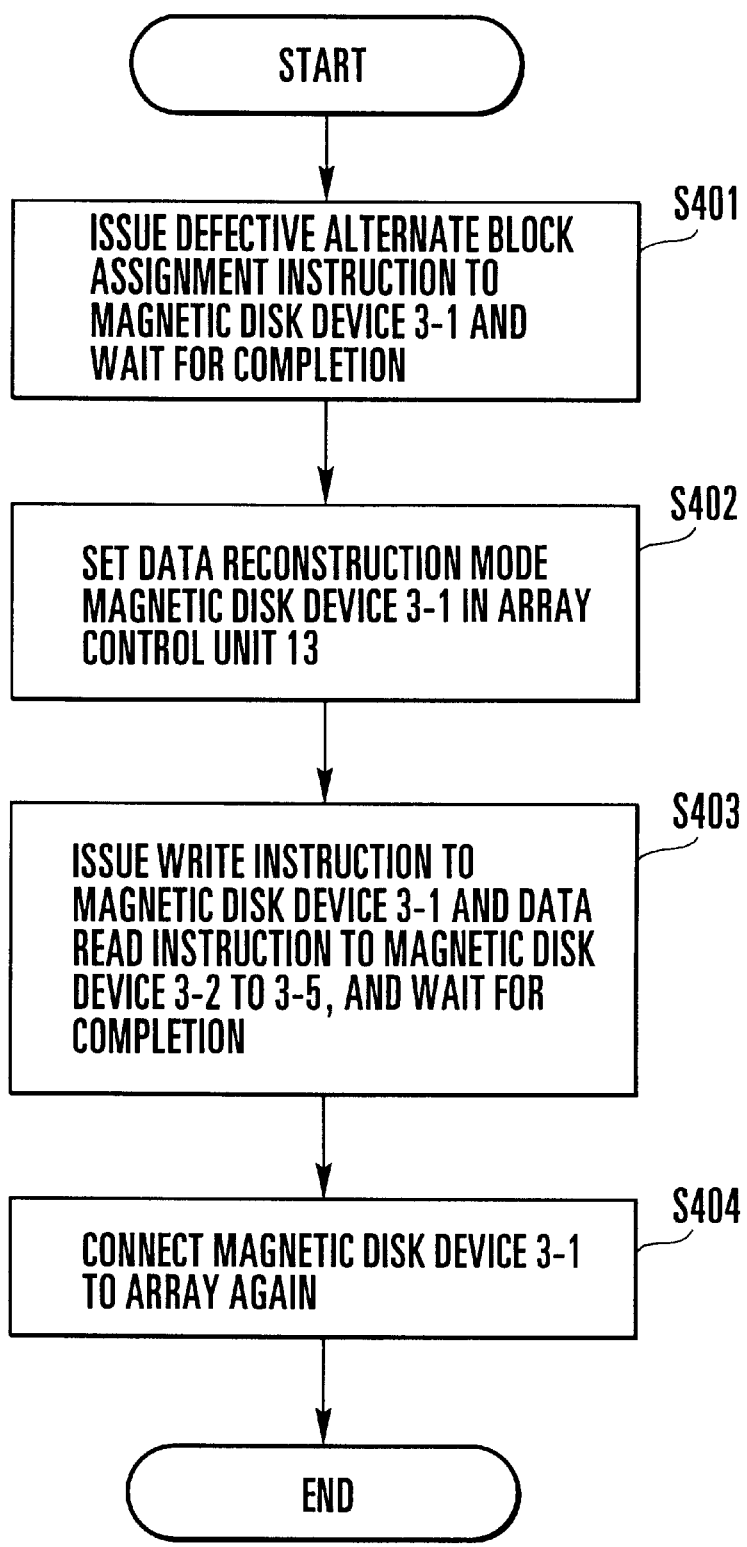
F I G. 4

DISK ARRAY APPARATUS THAT AVOIDS PREMATURE DECLARATIONS OF FAULTS

BACKGROUND OF THE INVENTION

The present invention relates to a disk array apparatus and, more particularly, to a disk array apparatus for automatically assigning a defective alternate block within the apparatus when an uncorrectable medium fault is detected.

A known example of the technique for increasing the reliability of magnetic disk devices is a disk array apparatus for storing and reading out data or redundant data such as calculated parity data in and from a plurality of magnetic disk devices. In the computer field, the magnetic disk device for storing data is being demanded for higher reliability, larger capacity, higher performance along with higher performance of the CPU (Central Processing Unit) and a larger data amount processed by the computer system. The disk array technique receives a great deal of attention as a magnetic disk application technique which meets these demands.

Even if a disk fails, the disk array apparatus can reconstruct data stored in the faulty magnetic disk using redundant data such as parity data to normally input/output data from/to a host computer. A technique using this feature of the disk array apparatus has already been proposed. According to this technique, when processing is done upon reception of a read instruction from the host computer, a disk delayed in response owing to an uncorrectable medium fault retry within the magnetic disk device is temporarily disconnected. Readout data is generated using remaining magnetic disk device data and sent to the host computer to guarantee the response performance to the host computer.

Japanese Patent Laid-Open No. 7-200191 discloses the technique of temporarily disconnecting a disk delayed in response, and when the disk device reports an uncorrectable medium fault, setting a defective alternate block within an apparatus.

The conventional disk array apparatus assigns a defective alternate block immediately when an uncorrectable medium fault occurs in the disk device.

The causes of the uncorrectable medium fault in the disk device are a scratch or damage on the magnetic disk medium surface, dust or foreign substance attached to the medium surface or write/read head, degradation in read characteristics of the write/read head due to a temperature change, and the like. If a scratch or damage on the magnetic disk medium surface causes an uncorrectable medium fault, a defective alternate area can be quickly assigned to the block having the medium fault.

If dust on the medium surface or the temperature of the write/read head causes an uncorrectable medium fault, this fault is temporary and may be canceled to normally read data upon removal of dust from the medium surface or a temperature change in write/read head. In this case, although the fault is not an actual medium fault, defective alternate processing is executed to consume an alternate block.

SUMMARY OF THE INVENTION

It is an object of the present invention to provide a disk array apparatus capable of reducing consumption of defective alternate blocks of a magnetic disk when the defective alternate block of the magnetic disk medium is assigned in the disk array apparatus upon occurrence of an uncorrectable medium fault.

To achieve the above object, according to the present invention, there is provided a disk array apparatus comprising detection means for detecting a faulty magnetic disk device delayed in response to a read instruction from a host device out of a plurality of magnetic disk devices constituting an array, delay means for outputting a delay signal on the basis of an output from the detection means, instruction issue means for issuing a retry instruction to the faulty magnetic disk device on the basis of the delay signal from the delay means, first determination means for determining in response to the retry instruction from the instruction issue means whether the faulty magnetic disk device normally ends read processing, and assignment means for assigning a defective alternate block to the faulty magnetic disk device when a determination result of the first determination means does not represent a normal processing end.

BRIEF DESCRIPTION OF THE DRAWINGS

FIG. 2 is a flow chart showing control operation of a microprocessor in response to a read instruction from a host device;

FIG. 4 is a flow chart showing control operation of the microprocessor associated with defective alternate block assignment processing.

DESCRIPTION OF THE PREFERRED EMBODIMENT

The present invention will be described in detail below with reference to the accompanying drawings.

Figure 1:
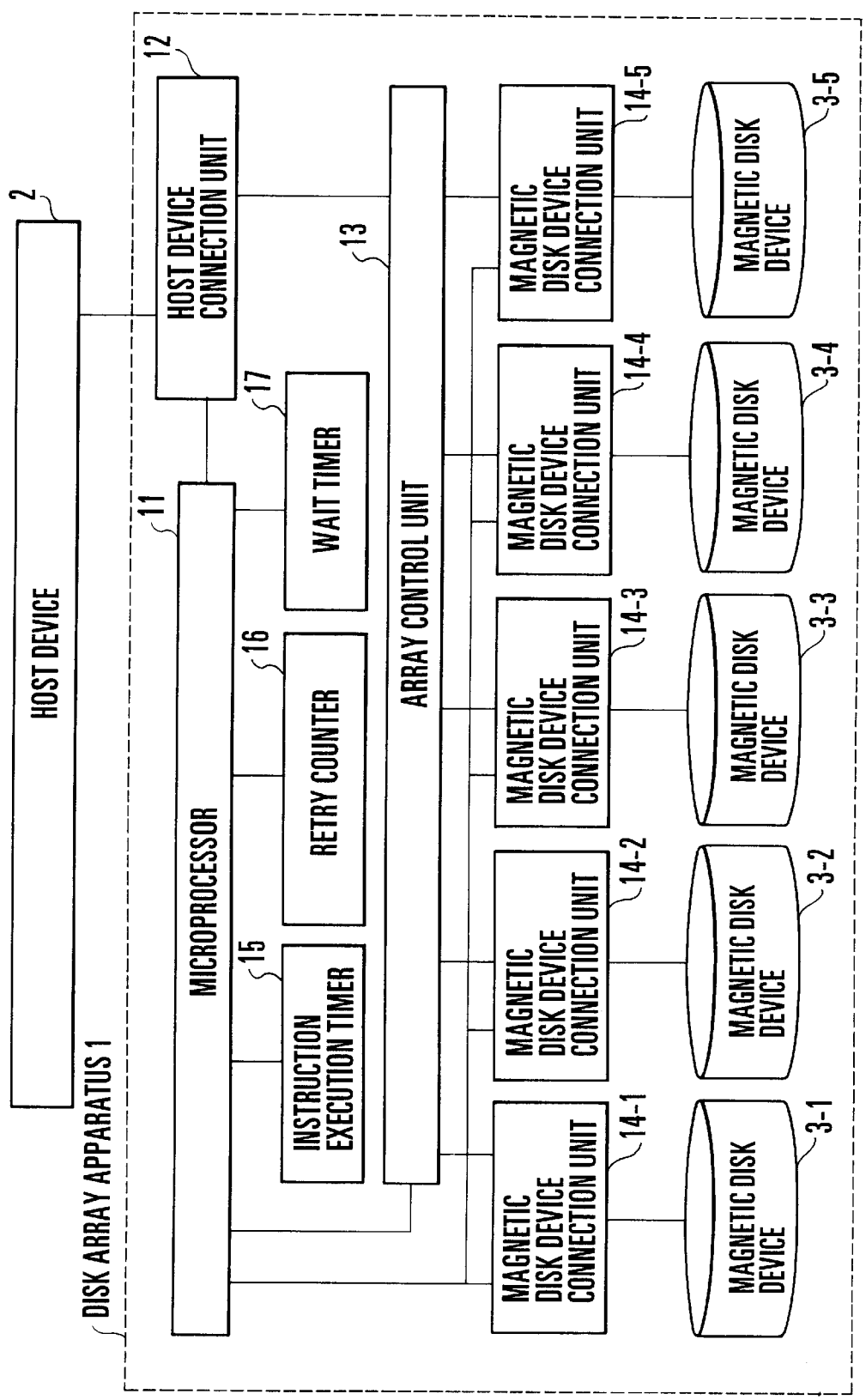
FIG. 1 is a block diagram showing a disk array apparatus according to an embodiment of the present invention.

FIG. 1 shows a disk array apparatus according to an embodiment of the present invention. In FIG. 1, a disk array apparatus 1 comprises a microprocessor 11, a host device connection unit 12 connected to the microprocessor 11, an array control unit 13 connected to the microprocessor 11 and host device connection unit 12, magnetic disk device connection units 14-1 to 14-5 connected to the microprocessor 11 and array control unit 13, an instruction execution timer 15, retry counter 16, and wait timer 17 connected to the microprocessor 11, and magnetic disk devices 3-1 to 3-5 respectively connected to the magnetic disk device connection units 14-1 to 14-5. The disk array apparatus 1 is connected to a host device 2 via the host device connection unit 12.

The disk array apparatus 1 accesses the magnetic disk devices 3-1 to 3-5 within the apparatus to write/read data upon reception of an instruction from the host device 2. The host device 2 is a host computer for instructing the disk array apparatus 1 to write/read data.

The microprocessor 11 monitors the whole disk array apparatus 1 to output an instruction. The host device connection unit 12 controls an interface between the disk array apparatus 1 and host device 2. The array control unit 13 divides/synthesizes written/readout data. The magnetic disk device connection units 14-1 to 14-5 control interfaces with the connected magnetic disk devices 3-1 to 3-5.

The instruction execution timer 15 monitors the lapse time after the disk array apparatus 1 starts executing a write/read instruction from the host device 2. The retry counter 16 is used to retry uncorrectable errors generated in the magnetic disk devices 3-1 to 3-5. The wait timer 17 sets a time interval for performing retry processing.

The function of the array control unit 13 will be explained in more detail.

The array control unit 13 divides write data sent from the host device 2 into four data, and generates redundant data from the four divided data to send them to the magnetic disk devices 3-1 to 3-5. The array control unit 13 synthesizes data read out from the magnetic disk devices 3-1 to 3-5 to send the synthesized data to the host device 2. At this time, the array control unit 13 compares the readout data with the redundant data to check the data consistency.

If one magnetic disk device fails in a data read, the array control unit 13 reconstructs defective data from data read out from the remaining magnetic disk devices and redundant data to send the reconstructed data to the host device. Also, as will be described in more detail shortly, when defective data due to a fault of a magnetic disk device is to be reconstructed in the repaired magnetic disk device, the array control unit 13 likewise reconstructs data from the remaining magnetic disk devices and redundant data to be then returned to the repaired magnetic disk device for storage in a newly assigned alternate block of the repaired magnetic disk device.

These operation modes of the magnetic disk device are designated by the microprocessor 11.

In this embodiment, the array is constituted by five magnetic disk devices. However, the array suffices to be constituted by two or more, i.e., n magnetic disk devices. For the number n of magnetic disk devices, redundant data such as parity data is written in at least one magnetic disk device, and data are written in the remaining magnetic disk devices.

Operation of the disk array apparatus having this arrangement will be described with reference to the flow chart in FIG. 2.

Normal read operation will be explained. When the host device 2 issues a data read instruction to the disk array apparatus 1, the microprocessor 11 receives and recognizes the read instruction via the host device connection unit 12 (step S201). Upon reception of the instruction, the microprocessor 11 resets the instruction execution timer 15 to start monitoring the timer (step S202). The microprocessor 11 issues a data read instruction to the magnetic disk devices 3-1 to 3-5 via the magnetic disk device connection units 14-1 to 14-5 (step S203).

The microprocessor 11 controls the array control unit 13. That is, the microprocessor 11 sets the array control unit in an operation mode in which readout data sent from the magnetic disk device connection units 14-1 to 14-5 are synthesized to send the synthesized data to the host device connection unit 12 (step S204). Then, a data read starts in the magnetic disk devices 3-1 to 3-5 to send respective readout data to the array control unit 13 via the magnetic disk device connection units 14-1 to 14-5.

The array control unit 13 synthesizes the received data to send the synthesized data to the host device connection unit 12. Meanwhile, the microprocessor 11 monitors the lapse of a time after the execution start of the instruction by the instruction execution timer 15 (step S205). The microprocessor 11 also monitors the progress of data synthesis in the array control unit 13. The synthesized readout data is sent to the host device 2 via the host device connection unit 12. The microprocessor 11 waits until the final data of the synthesized readout data is transferred (step S206).

When the read from the magnetic disk devices 3-1 to 3-5 is complete, and the magnetic disk devices 3-1 to 3-5 send read instruction end reports, the microprocessor 11 confirms them (step S207). The microprocessor 11 reports the read instruction end to the host device 2 via the host device connection unit 12 (step S208).

Next, operation when an uncorrectable medium fault occurs in the magnetic disk device 3-1 will be explained. In this case, redundant data is stored in at least one of the magnetic disk devices 3-2 to 3-5, and divided data except for one stored in the magnetic disk device 3-1 are stored in the remaining magnetic disk devices.

When an uncorrectable medium fault occurs in a block during a data read, the magnetic disk device 3-1 starts retry operation for recovery from the fault. For this reason, supply of readout data from the magnetic disk device 3-1 to the array control unit 13 stops. The array control unit 13 cannot synthesize data, and waits for supply of data from the magnetic disk device 3-1.

Upon the lapse of a predetermined time in this state, the microprocessor 11 detects the time-out of the instruction execution timer 15 in step S205. The microprocessor 11 checks the states of the array control unit 13 and magnetic disk device connection units 14-1 to 14-5 to recognize that data supply from the magnetic disk device 3-1 stops (step S209).

Then, the microprocessor 11 controls the array control unit 13 to temporarily disconnect the magnetic disk device 3-1 from array management. That is, the microprocessor 11 sets the array control unit 13 in a mode in which readout data to be sent to the host device 2 is generated from the magnetic disk devices 3-2 to 3-5 (step S210).

The microprocessor 11 processes subsequent readout data to wait for completion of transfer of all data (step S211). The microprocessor 11 confirms read instruction end reports from the magnetic disk devices 3-2 to 3-5 (step S212) to report the read instruction end to the host device 2 (step S208).

By this operation, even if data transfer is delayed owing to the fault of the magnetic disk device 3-1 constituting the array, readout data can be transferred to the host device 2 to complete a read instruction within a predetermined time.

Operation for a magnetic disk device having an uncorrectable medium fault will be described.

Even after the magnetic disk device 3-1 delayed in response due to an uncorrectable medium fault is disconnected in step S210 in FIG. 2, the magnetic disk device 3-1 internally continues retry processing. Since the magnetic disk device 3-1 has already been disconnected from the array, the microprocessor 11 manages the magnetic disk device 3-1 asynchronously from an instruction from the host device 2.

Figure 3:
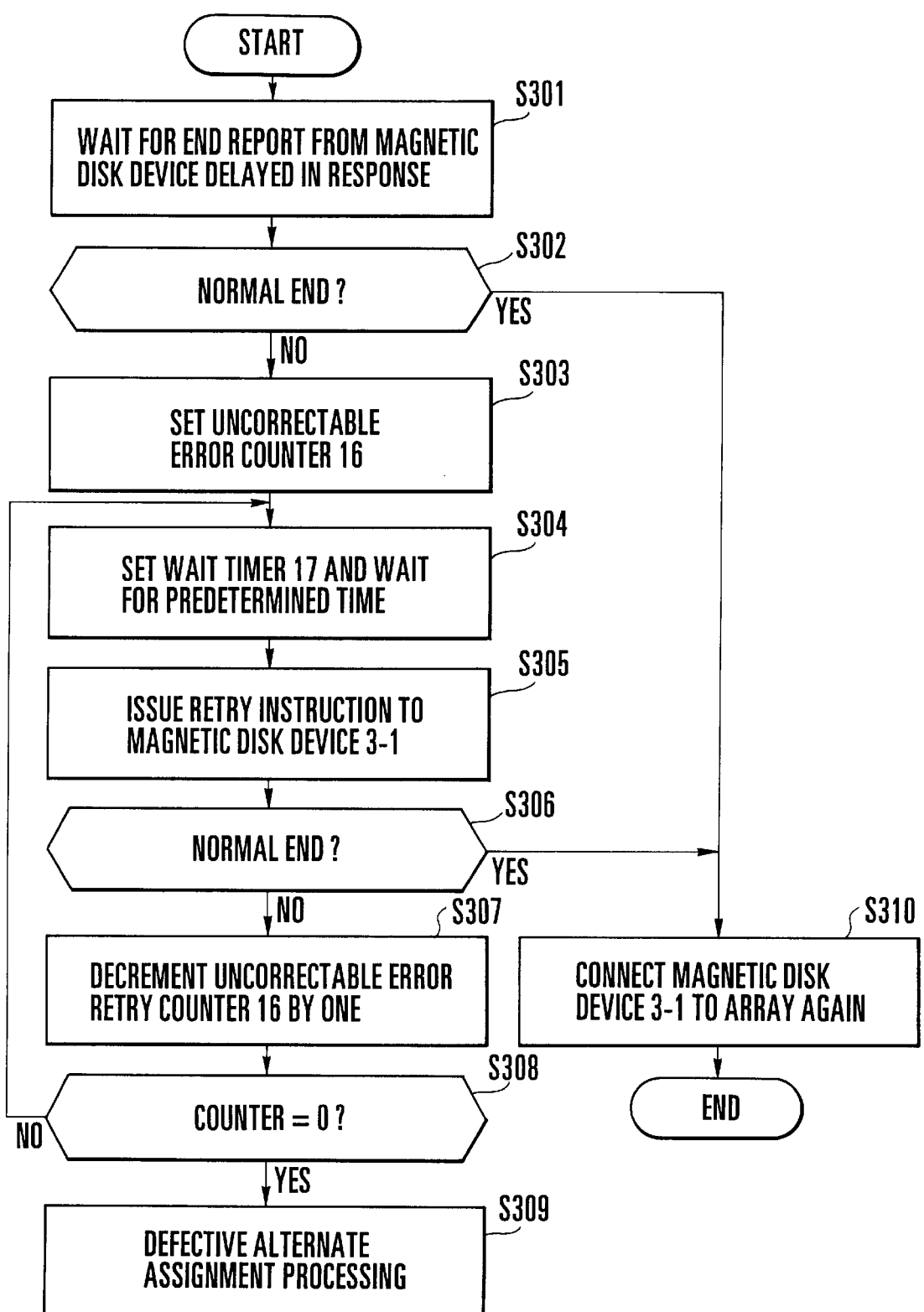
FIG. 3 is a flow chart showing control operation of the microprocessor with respect to a magnetic disk device delayed in response.

FIG. 3 shows operation of the microprocessor 11 with respect to the magnetic disk device 3-1 disconnected owing to a response delay.

In FIG. 3, the microprocessor 11 confirms a read instruction end report from the magnetic disk device 3-1 (step S301). This end report represents a normal end when the magnetic disk device 3-1 is finally successful in retry processing, or an uncorrectable medium fault when the magnetic disk device 3-1 fails in retry processing.

The microprocessor 11 checks whether the end report represents a normal end (step S302), and if YES in step S302, connects the magnetic disk device 3-1 to the array again (step S310). This is because when retry processing normally ends, dust on the medium or the like is considered to be removed during the internal retry operation of the magnetic disk device.

The microprocessor 11 sets a predetermined retry count in the retry counter 16 (step S303). This retry count is a parameter determined by the quality of the magnetic disk devices 3-1 to 3-5 and performance demanded for the disk array apparatus 1. In this embodiment, the retry count is set to 1, which means to perform retry processing once.

The microprocessor 11 waits for the lapse of a predetermined time using the wait timer 17 (step S304). This time is necessary for processing of setting the magnetic disk devices 3-1 to 3-5 to a static state to change the temperature of the magnetic disk drive when an uncorrectable medium fault by temperature changes in the magnetic disk devices 3-1 to 3-5 is reported.

The microprocessor 11 issues a read retry instruction to the magnetic disk device 3-1 via the magnetic disk device connection unit 14-1 (step S305). Data actually read out is discarded by the magnetic disk device connection unit 14-1.

The microprocessor 11 checks a read instruction end report from the magnetic disk device 3-1 (step S306). If a normal end is reported as a result of the check, the microprocessor 11 determines that the reported uncorrectable medium fault is caused by temperature characteristics and is not a permanent fault of the magnetic disk medium, and connects the magnetic disk device 3-1 to the array again (step S310). Even when dust is removed after step S302, the magnetic disk device 3-1 is connected to the array again.

If an uncorrectable medium fault is reported again in step S306, the microprocessor 11 decrements the retry counter 16 (step S307). The microprocessor 11 checks whether the retry count value is 0 (step S308), if YES in step S308, determines that the uncorrectable medium fault is a permanent fault of the magnetic disk device 3-1, and assigns a defective alternate block (step S309).

This processing of determining the permanent fault of the magnetic disk medium spends a long time, but is asynchronous from an instruction from the host device 2. During this processing, an instruction issued from the host device 2 can be executed by the four remaining magnetic disk devices to respond to the host device 2 without any delay.

FIG. 4 shows operation of the microprocessor 11 in defective alternate processing with respect to an uncorrectable medium fault.

In defective alternate block assignment processing shown in FIG. 4, the microprocessor 11 issues a defective alternate block assignment instruction to the magnetic disk device 3-1 (step S401). After issuing the assignment instruction, the microprocessor 11 sets the array control unit 13 in a mode in which data of the magnetic disk device 3-1 is reconstructed from data read out from the magnetic disk devices 3-2 to 3-5 to send the reconstructed data to the magnetic disk device 3-1 (step S402).

The microprocessor 11 issues a write instruction in a block having undergone defective alternate processing to the magnetic disk device 3-1, and a read instruction from corresponding blocks to the magnetic disk devices 3-2 to 3-5 (step S403). Upon completion of these instructions, the microprocessor 11 connects the magnetic disk device 3-1 to the array (step S404) to complete defective alternate block assignment processing.

Figure 5:
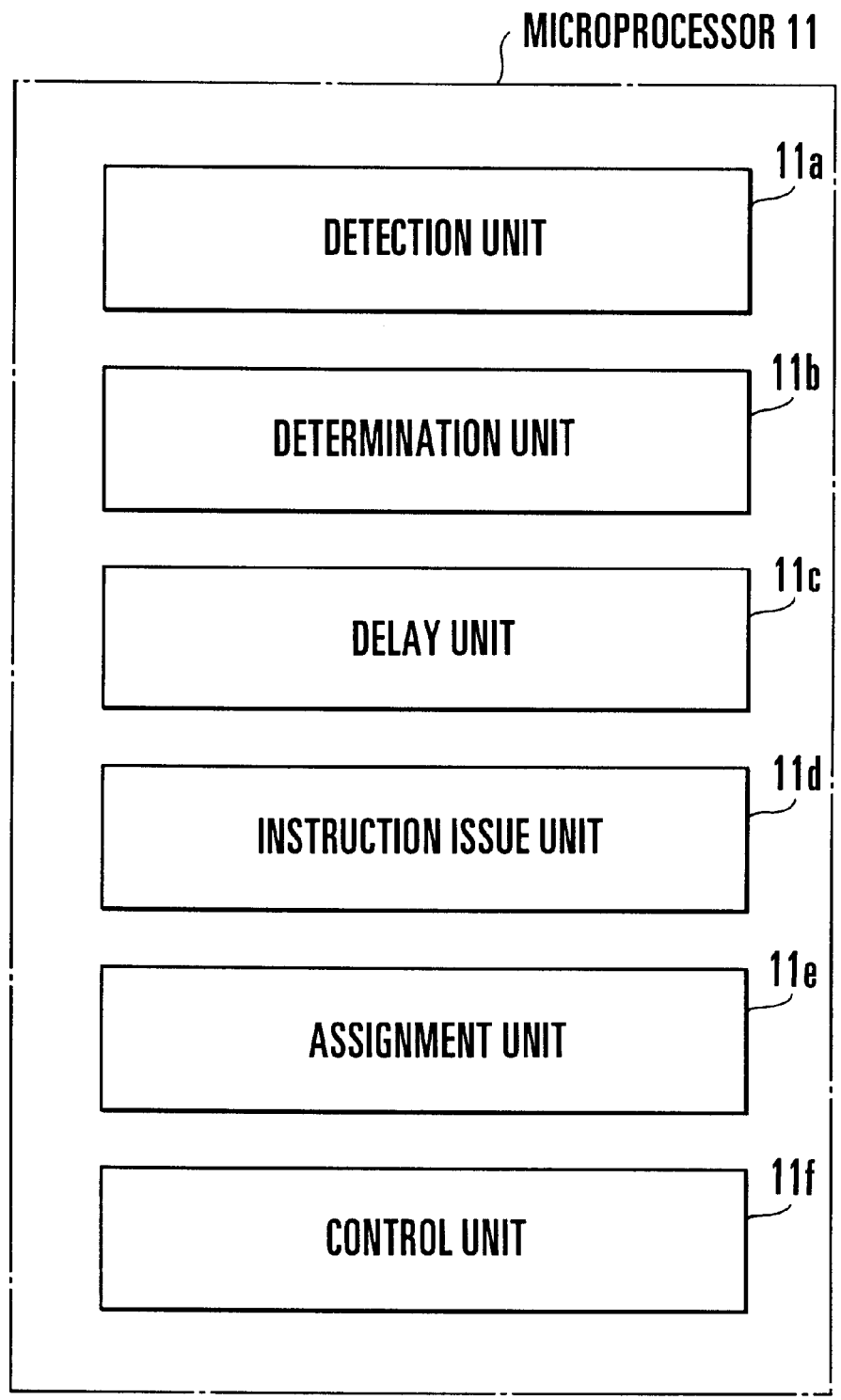
FIG. 5 is a functional block diagram showing the microprocessor in FIG. 1.

FIG. 5 shows the functional block of the microprocessor 11.

In FIG. 5, the microprocessor 11 comprises a detection unit 11a for detecting the magnetic disk device 3-1 delayed in response, a determination unit 11b for determining whether read processing normally ends on the basis of retry processing of the magnetic disk device 3-1, a delay unit 11c for delaying a signal from the detection unit 11a, an instruction issue unit 11d for issuing a retry instruction to the magnetic disk device 3-1, an assignment unit 11e for assigning a defective alternate block to the magnetic disk device 3-1, and a control unit 11f for performing data control including mode control of the array control unit 13.

The detection unit 11a performs processes in steps S205 and S209. The determination unit 11b performs processes in steps S302 and S306. A delay unit 11c performs a process in step S304. The instruction issue unit 11d performs a process in step S305. The assignment unit 11e performs a process in step S309. The control unit 11f controls the all units.

As has been described above, the present invention can reduce consumption of defective alternate blocks of the magnetic disk device.

This is because defective alternate block assignment processing is not performed immediately when the magnetic disk device reports an uncorrectable medium fault, but retry processing is performed after the lapse of a predetermined time. It is determined whether an uncorrectable medium fault by the temperature characteristics of the magnetic head is reported, a medium fault by dust on the medium surface is temporarily reported, or an uncorrectable fault by an actual magnetic medium fault is reported. Only when an actual magnetic medium fault occurs, defective alternate block assignment processing is performed.

What is claimed is:

1. A disk array apparatus comprising:

detection means for detecting a faulty magnetic disk device delayed in response to a read instruction from a host device out of a plurality of magnetic disk devices constituting an array;

delay means for outputting a delay signal on the basis of an output from said detection means;

instruction issue means for issuing a retry instruction to the faulty magnetic disk device on the basis of the delay signal from said delay means;

first determination means for determining in response to the retry instruction from said instruction issue means whether the faulty magnetic disk device normally ends read processing; and assignment means for assigning a defective alternate block to the faulty magnetic disk device when a determination result of said first determination means does not represent a normal processing end.

2. An apparatus according to claim 1, wherein said apparatus further comprises control means for temporarily disconnecting the faulty magnetic disk device delayed in response from the array on the basis of an output from said detection means, and managing the faulty magnetic disk device asynchronously from an instruction from the host device, and the faulty magnetic disk device internally continues read instruction retry processing.

3. An apparatus according to claim 2, wherein when the determination result of said first determination means represents a normal processing end, said control means connects the faulty magnetic disk device to the array again.

4. An apparatus according to claim 2, wherein said apparatus further comprises second determination means for determining whether the faulty magnetic disk device normally ends read processing by internal retry processing, and when a determination result of said second determination means represents a normal processing end, said control means connects the faulty magnetic disk device to the array again.

5. An apparatus according to claim 4, wherein said delay means further comprises a wait timer which starts based on the determination result of said second determination means that does not represent a normal. processing end, and said instruction issue means issues a retry instruction upon a lapse of a sufficient time for setting the faulty magnetic disk device to a static state in accordance with a timer output from said wait timer.

6. An apparatus according to claim 4, wherein after the faulty magnetic disk device is disconnected, said control means synthesizes data read out from magnetic disk devices except for the faulty magnetic disk device to complete data transfer, confirms processing-ended reports from the magnetic disk devices except for the faulty magnetic disk device, and outputs a read instruction end report to the host device, and said second determination means starts determination operation after said control means outputs the read instruction end report to the host device.

7. An apparatus according to claim 1, wherein when the determination result of said first determination means does not represent a normal processing end, said assignment means determines that a permanent fault occurs in the faulty magnetic disk device, and assigns a defective alternate block.

8. An apparatus according to claim 1, wherein said apparatus further comprises a retry counter for setting a retry count, and said instruction issue means issues a retry instruction every predetermined time in accordance with a counter value of said retry counter.

9. A disk array apparatus comprising:

a plurality of magnetic disk devices, each said magnetic disk device having a plurality of data blocks and a plurality of defective alternate blocks, said defective alternate blocks being used as an alternate for a data block determined to be defective; and a controller, wherein said controller determines when one magnetic disk device of said magnetic disk devices is defective based on whether one of said one magnetic disk device's data blocks contains a defect, and said controller subsequently automatically assigns one of said plurality of defective alternate blocks in said one defective magnetic disk device as an alternate for said data block determined to be defective, said assignment occurring only after a time delay during which time delay said controller confirms said data block is defective.

10. The disk array apparatus of claim 9, wherein said controller further controls a reconstruction of data stored on said data block determined to be defective, said data reconstruction being based on data stored on at least one of said plurality of magnetic disk devices other than said magnetic disk device determined to have said defective data block.

11. The disk array apparatus of claim 10, wherein said controller further performs at least one of the following:

transmits said reconstructed data to an external host that has requested data located at said data block determined to be defective; and stores said reconstructed data into said assigned defective alternate block.

12. A controller for a magnetic disk device having a plurality of data blocks and a plurality of defective alternate blocks to be used as an alternate for one of said data blocks determined to be defective, said controller comprising:

a first logic to determine whether one of said data blocks contains a defect;

a timer for setting a preset time delay;

a second logic to automatically assign one of said defective alternate blocks as an alternate for said data block determined to contain a defect, said automatic assignment occurring at the end of said preset time delay.

13. The controller of claim 12, further comprising:

a third logic to reconstruct a data originally contained on said data block determined to contain a defect, said reconstruction occurring from a redundant data located elsewhere from said data block determined to contain a defect.

14. The controller of claim 13, further comprising:

a fourth logic to accomplish at least one of transmitting said reconstructed data to an external host that has requested data located at said data block determined to be defective and storing said reconstructed data into said assigned defective alternate block.

15. A method of preventing a premature assignment to a defective alternate block as an alternate for a data block on a magnetic disk device, said magnetic disk device having a plurality of data blocks and a plurality of defective alternate blocks to be used as an alternate to one of said data blocks determined to be defective, said method comprising:

determining that a data block of said data blocks contains a defect;

waiting for a preset time to elapse;

determining whether said defect remains in said data block; and assigning a defective alternate block of said defective alternate blocks to be an alternate for said defective data block only if said defect is determined to remain in said data block.

16. The method of claim 15, further comprising:

reconstructing a data that was stored on said data block determined to be defective, said reconstruction being performed from redundant data stored in a location other than said defective data block.

17. The method of claim 16, further comprising at least one of the following:

transmitting said reconstructed data to an external host that has requested data located at said data block determined to be defective; and storing said reconstructed data into said assigned defective alternate block.

* * * * *